(12) United States Patent  (10) Patent No.: US 6,716,261 B2
Carroll et al.  (45) Date of Patent: Apr. 6, 2004

(54) CRITICALITY SAFE VACUUM AND SAFE GEOMETRY TRANSPORT VEHICLE

(75) Inventors: Michael K. Carroll, Knoxville, TN (US); James S. Kerns, Harriman, TN (US); John C. McCracken, Knoxville, TN (US)

(73) Assignee: Inventure Laboratories, Inc., Knoxville, TN (US)

( * ) Notice: Subject to any disclaimer, the term of this patent is extended or adjusted under 35 U.S.C. 154(b) by 0 days.

(21) Appl. No.: 10/195,249

(22) Filed: Jul. 15, 2002

(65) Prior Publication Data

US 2004/0006953 A1 Jan. 15, 2004

(51) Int. Cl.$^7$ .............................................. B01D 50/00
(52) U.S. Cl. ......................... 55/337; 55/356; 55/429; 55/467; 55/482; 55/505; 55/DIG. 9
(58) Field of Search ...................... 55/337, 482, 467, 55/486, 356, 429, 505, DIG. 9

(56) References Cited

U.S. PATENT DOCUMENTS

| 5,163,786 A | * 11/1992 | Christianson | 406/41 |
| 5,273,561 A | 12/1993 | Zeren | |
| 5,301,388 A | 4/1994 | Zeren | |
| 5,478,484 A | * 12/1995 | Michaluk | 210/788 |
| 5,491,345 A | 2/1996 | Stoutenburgh | |
| 6,171,356 B1 | 1/2001 | Twerdun | |

* cited by examiner

Primary Examiner—Robert A. Hopkins
(74) Attorney, Agent, or Firm—Pitts & Brittian, P.C.

(57) ABSTRACT

A criticality safe vacuum apparatus for removal of particulates from a gas having radioactive particles entrained therein. The apparatus includes a first staged segment including a cyclone housing and a second staged segment including a first filtration media for removal of particulates from gas. The cyclone housing is configured to accept insertion of a gas collection end of the second staged segment, and includes an intake port and an elongated length extended to a particulate collection container. Within the cyclone housing, cyclonic flow separates particulates from gas, with the gas moved by vacuum pressure into the first filtration media concurrently with particulates settling into the collection container. A third staged segment of a second air filtration media is positioned upgradient of the first filtration media. Vacuum pressure is maintained to induce gas flow through the first staged segment and through the second and third staged segments for separation of residual fine particles from the gas flow. A transport vehicle is disclosed for support of the cyclone housing and second staged segment, with a safe geometry provided for the collection container storing radioactive particles to minimize the occurrence of a nuclear criticality reaction.

20 Claims, 4 Drawing Sheets

US 6,716,261 B2

CRITICALITY SAFE VACUUM AND SAFE GEOMETRY TRANSPORT VEHICLE

CROSS REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of Invention

This invention pertains to a particulate removal system and an apparatus for entrapment and collection of particulate material from gases. More particularly, this invention pertains to a vacuum apparatus providing criticality safe collection of radioactive particles entrained in gas and a transport vehicle for safe storage and transport of the vacuum apparatus having collected radioactive materials therein in order to protect an operator.

2. Description of the Related Art

Typical of prior art devices are shop vacuums that are modified to include dust collection reservoirs that are of limited internal size in order to collect fissionable materials in particulate form within the shop vacuum, which is disposed of as a complete unit identified as radioactive waste. A prior art device includes a conventional vacuum head motor attached to a container having mesh filter bags within the container. The mesh filter bags are oriented within the container with air filtering through each bag and into an internal bottle or small-sized container that is made of metal mesh or a material sized to minimize criticality reactions between radioactive particles entrapped by the filter bags. The mesh filter bags require periodic removal for replacement or cleaning, and the internal bottle or small-sized container typically requires periodic removal for replacement. The operator is potentially exposed to radioactive particles during opening of the outer container, replacement of internal containers, and during any attempts at cleaning of the vacuum pickup device, unless the device is maintained within a sealed glove box. If positioned within a glove box, the vacuum pickup device fails to provide mobility, due to the sizing of the device to fit within glove boxes utilized in nuclear reactor facilities and/or in glove boxes at a facility that manages fissionable materials. Once placed within a glove box, the vacuum pickup device is not generally cleaned and removed, but is disposed of as radioactive contaminated waste after the radioactive particles are removed for recycle or for disposal.

Another prior art device is a vacuum pickup device including a centrally positioned vacuum motor that is in fluid flow communication with one or a plurality of vertically oriented, spaced apart canisters having a filter bag in each canister. A high efficiency particulate (HEPA) filter is located intermediate of the centrally positioned vacuum motor, such as in an elongated central container, with the HEPA filter in fluid flow communication between the canisters and the vacuum motor. When air or liquid containing radioactive particles is drawn into an intake hose, the air or liquid travels through one cannister or the plurality of canisters, through the central container, through the HEPA filter, for exiting from exhaust ports proximal to the vacuum motor. The vacuum pickup device fails to provide easily accessible filter bags in each canister for replacement, and provides a HEPA filter positioned to require periodical opening of the central container for visual checking for accumulation of radioactive materials to determine the need for replacement before a criticality reaction occurs. Repetitive visual inspections of the canisters, and/or monitoring of changes in air pressure through the prior art device, suggestive of filter clogging, requires frequent maintenance by an operator of the vacuum pickup device.

Another prior art device is a cyclonic vacuum generator including a canister having a hole or opening into which debris laden air is received for distribution through a central area of the canister. At least two internal conical members and a cone filter shroud guides the flow of debris laden air through a nonlinear path downwards within the canister in order to direct the air flow through low pressure areas to direct debris downwards into the lower portion of the canister. Additionally, internal flutes are positioned in the lower portion of the canister to slow down air traveling through the lower portion of the canister. The debris is deposited in the lower portion of the canister, with periodic clean-out required for the debris including opening of the canister and pouring of the debris from the lower portion of the canister. Air is exhausted by being drawn upwards from the lower casing through an open-bottomed cone by a motor and fan located in an upper portion of the cannister. Air is drawn upwards through a one-stage, or a two-stage conical filter held within the cone filter shroud for capture of small particles before the air is evacuated from an exhaust outlet. The cyclonic vacuum generator does not provide a separate, second or third filter media that is interchangeable with secondary filters of different efficiencies, and fails to provide a second or third filter that is removable without displacing the primary, first filter within the filter shroud. Further, the design of the cyclonic vacuum generator fails to provide interchangeable lower portion sections that are dimensioned to provide criticality safe separation of particles while allowing alternate configurations for separations of different particle size distributions in contaminated gas streams. Further, the design of the cyclonic vacuum generator fails to provide a lower, detachable and replaceable, collection container that is sized to maintain accumulated radioactive materials in a criticality safe configuration. A quick disconnect and a replacement collection container, nor a method for rapid interchange of collection containers, is not provided in order to minimize opening of the vacuum device and to minimize leakage of radioactive contamination upon the removal of accumulated debris and particles.

There is a need for a vacuum powered apparatus providing multiple stages of separation of progressively finer particulates from gas mixtures. There is a need for a forced air powered system including at least a first stage of cyclonic flow that precipitates radioactive particles from gas mixtures before a secondary stage of filtration of the gas mixtures in order to eliminate or to minimize the volume and radioactivity content of filter media requiring long-term storage. There is a further need for a vacuum powered apparatus providing multiple stages of separation for radioactive particles, while providing criticality safe geometry for each separation stage and for storage therein. There is an additional need for a vacuum powered system providing a method of operating providing multiple stages of separation for radioactive particles within a portable apparatus that includes adjustable cyclonic lengths and a collection portion that maintains captured radioactive particles in a configuration that minimizes the possibility of an occurrence of a nuclear criticality reaction.

BRIEF SUMMARY OF THE INVENTION

According to one embodiment of the present invention, a vacuum system is provided including an apparatus having multiple stages of removal of particulate entrained in gas while providing criticality safe collection and storage of radioactive particles. Further, a transport vehicle is provided for criticality safe support of the apparatus and for transport of the apparatus containing radioactive particles and potentially fissionable materials. The staged removal of particulates includes ally fissionable materials, from a gas flow induced by a forced air generator incorporated in the apparatus. One use of the apparatus is for collection of radioactive particles having a capacity for initiating nuclear criticality reactions if the particles are not maintained in a volume and shape-limited geometry. The apparatus includes at least two stages of particle separation, including a first filter housing having a gas collection end and a gas exhaust end, with the gas collection end having a diameter less than the diameter of the gas exhaust end. The apparatus includes a cyclone housing releasably attached to the exhaust end of the first filter housing including a filtration media disposed therein for flow of gas through a central channel within the filter housing. The cyclone housing includes a first upper end having a connector flange attached thereto, and having a sufficient upper diameter for insertion therein of the gas collection end of the first filter housing. The cyclone housing is configured in an elongated length that is extended to a particle collection end, with a gas intake port in one side of the cyclone housing. The particle collection end includes a second diameter of a lesser diameter than the first diameter of the first end of the cyclone housing, in order to maintain a cyclonic flow of gas and particles through the cyclone housing for a first stage of separation of particles from the flow of gas. The first stage of particle separation by cyclonic movement of gas and particles provides for collection into the particle collection end of particles having a diameter of greater than about two microns. The flow of gases is counter-current and generally upwards from generally downwards movement of collected particles toward the particle collection end.

The gas collection end of the first filter housing includes a length sufficient to extend from the connector flange of the cyclone housing into the cyclone housing below the gas intake port in the cyclone housing. The opening in the first filter housing gas collection end is configured to have a size-limited geometry for passage of radioactive particles without an occurrence of a criticality reaction. The gas intake port through the cyclone housing wall is positioned below the first end of said cyclone housing, with the intake port positioned at about a mid-portion of the first filter housing when inserted into the cyclone housing. A forced air generator such as a vacuum device and motor, provides a vacuum induced flow of gases through the cyclone housing with induction of a non-linear flow of contaminated gases and particles from the gas intake port, around the lower end of the first filter housing, and generally downwards through a portion of the cyclone housing. After cyclonic swirling of the gases and particles, the gases are induced to flow upwardly into the gas collection end of the first filter housing. The heavier particles are directed downward by cyclonic flow and gravity toward the particle collection end of the cyclone housing. The flow of gases is into the lower end of the first filter housing and toward the vacuum device. The gases are channeled by an internal channel to flow into a perimeter of a first HEPA filter removably supported within the first filter housing. The gas flow is channeled into the perimeter of the HEPA filter, through the HEPA filter media, and out of a central opening of the HEPA, providing a second stage of particle separation from the flow of gas. A third stage of particle separation is provided by a second filtration media removably disposed above the internal channel and above the first filter housing, with the second filtration media providing an internal opening for flow of gas therein and through the second filtration media. The gas flow exits at a perimeter of the second filtration media and exits from a containment housing through gas exhaust vents. The three stages of particle separation provide at least about 99.999% separation of fine particles from a gas stream, while providing internally safe geometry for collected radioactive particles that may have a capacity for initiating nuclear criticality reactions if not maintained in a volume limited geometry.

BRIEF DESCRIPTION OF THE SEVERAL VIEWS OF THE DRAWINGS

The above-mentioned features of the invention will become more clearly understood from the following detailed description of the invention read together with the drawings in which.

DETAILED DESCRIPTION OF THE INVENTION

An apparatus is disclosed for separation of particulates and radioactive particles from a gas, and safe containment of the separated radioactive particles. The apparatus includes at least a first staged segment 22 and a second staged segment 12 providing separation of radioactive particles from gases. The particulates and other solid materials entrained in the flow of gas may include radioactive particles and other solid materials that are capable of initiating nuclear criticality reactions. A three-stage separation system including a third staged segment 40 forming an internal flow channel 40' extended within the second staged segment 12 is also disclosed for channeling a gas stream through a criticality safe vacuum system for separation and containment of radioactive particles capable of initiating nuclear criticality reactions. The separation system includes a plurality of components that provide three stages of separation of the particulates from gases and gas/liquid mixtures while maintaining the separated particles in a restricted volume housing having a size-limiting geometry in order to maintain safe storage of a non-critical volume of radioactive particles therein. The plurality of components of the vacuum apparatus 10 is illustrated as an assembled configuration in FIG.

Figure 3:
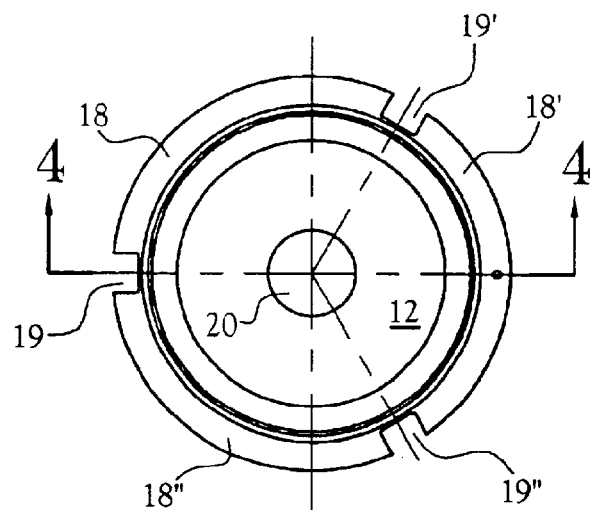
FIG. 3 is a top view of a second staged segment housing of FIG. 1.
Figure 4:
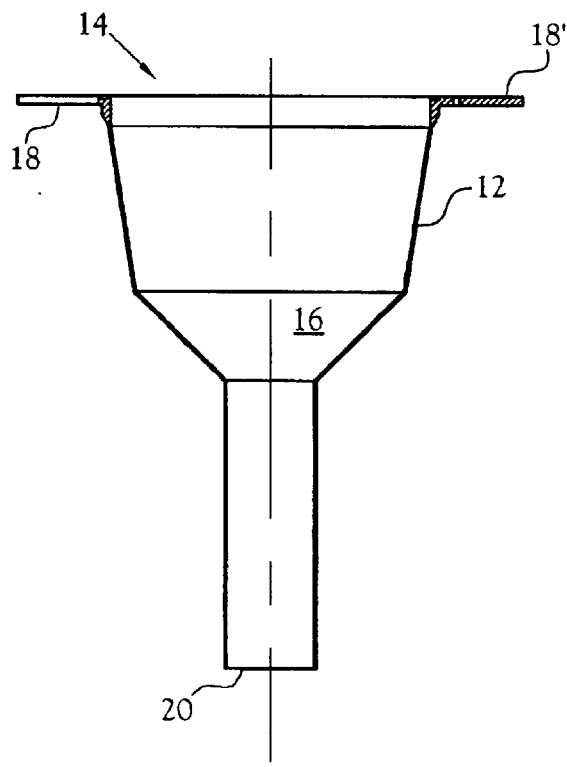
FIG. 4 is a section view along 4—4 of FIG. 3, illustrating a section view of the second staged segment housing.
Figure 6:
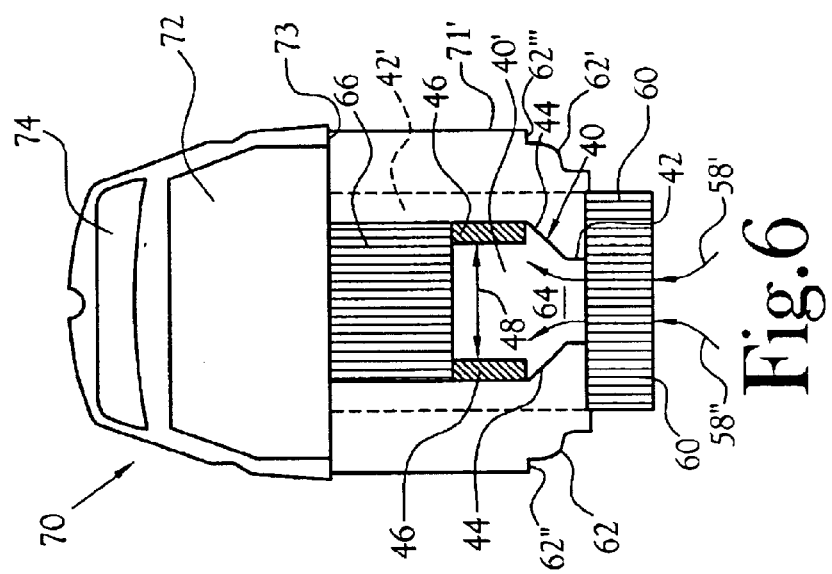
FIG. 6 is a side perspective view illustrating a vacuum chamber housing having a first and a second filtration unit attached thereto.

1, including staged and stacked segments forming an elongated, cylindrical apparatus 10. A second staged segment includes a first filter housing 12 having a first, lower end 20 inserted into a first staged segment including a cyclone housing 22 that provides a cyclonic flow of gas through the first stage for separation of particulates from gases. A third stage segment 40 includes an internal channel 40' leading between a first filtration media 60 to a second filtration media 66 and a forced air generator, such as a vacuum motor contained in a vacuum motor housing 70, which is releasably attached at connector flange 18, 18', 18", to be extended from to a second, upper end 14 of the first filter housing 12. The first filter housing 12 includes a first, lower end, also identified as a gas collection end 20, and a second, upper end, also identified as a gas exhaust end 14 (see FIG. 3 and 4). The gas collection end 20 is a smaller diameter than the gas exhaust end 14 due to a funnel shaped mid-portion 16 that provides an increase in diameter of the first filter housing 12 as gas moves upwards through the first filter housing 12, with resulting slowing of the movement of gas 58, 58', 58" between gas collection end 20 and the mid-portion 16. A connector flange 18, 18', 18" includes connector inserts 19, 19', 19" therein (see FIG. 3 and 4). The vacuum motor housing 70 includes a base having outer cylindrical surface edges 62", 62'" that are releasably mated utilizing clamps and/or latch connectors (not shown) known to those skilled in the art for sealing attachment to connector flange 18, 18', 18". A lower portion of the vacuum motor housing 70 is removably positioned with the outer surface edges of the inwardly sloped base wall portions 62, 62' (see FIGS. 1 and 6), extended within the gas exhaust end 14 of the first filter housing 12 for leak-tight connection to the vacuum motor housing 70.

Figure 2:
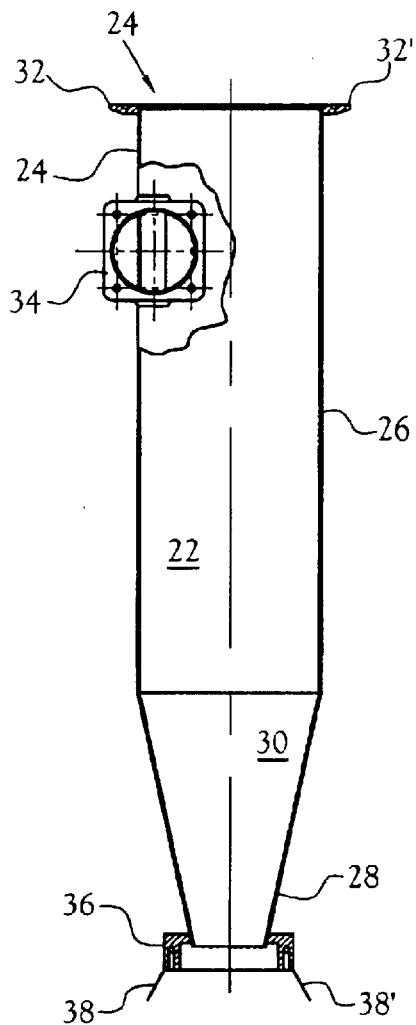
FIG. 2 is a lower first staged segment housing of the two stag housing of FIG. 1.

The cyclone housing 22 includes a first end, identified as a flanged connector end 24, and a second end, identified as a particle collection end 28 (see FIG. 2). The cyclone housing 22 includes an elongated cylindrical length that includes a funnel shaped portion 30 that tapers to a smaller diameter at the particle collection end 28, as compared to the diameter of the flanged connector end 24. A ring-shaped connector flange 32 is disposed around the flanged connector end 24, with the connector flange 32 allowing the cyclone housing 22 to be attached to, and detached from, the first filter housing 12 for replacement of the cyclone housing 22 with a different length-sized and like-configured cyclone housing, having a length either longer, shorter, or having a varied inside diameter leading to the particle collection end 28, in order to provide alternative cyclonic gas flow for separation in the first staged segment of a different range of particle sizes (larger or smaller) entering the intake port 34 as a mixture of particles 50 entrained in a gas. A different sized cyclone housing having an alternative internal diameter, and/or a different length will produce alternative cyclone flow paths within the vacuum system 10 for cyclonic separation of different particle sizes from the gas and particles 50 without the need to change the first filter housing 12 or the vacuum generating device and motor 72.

Figure 1:
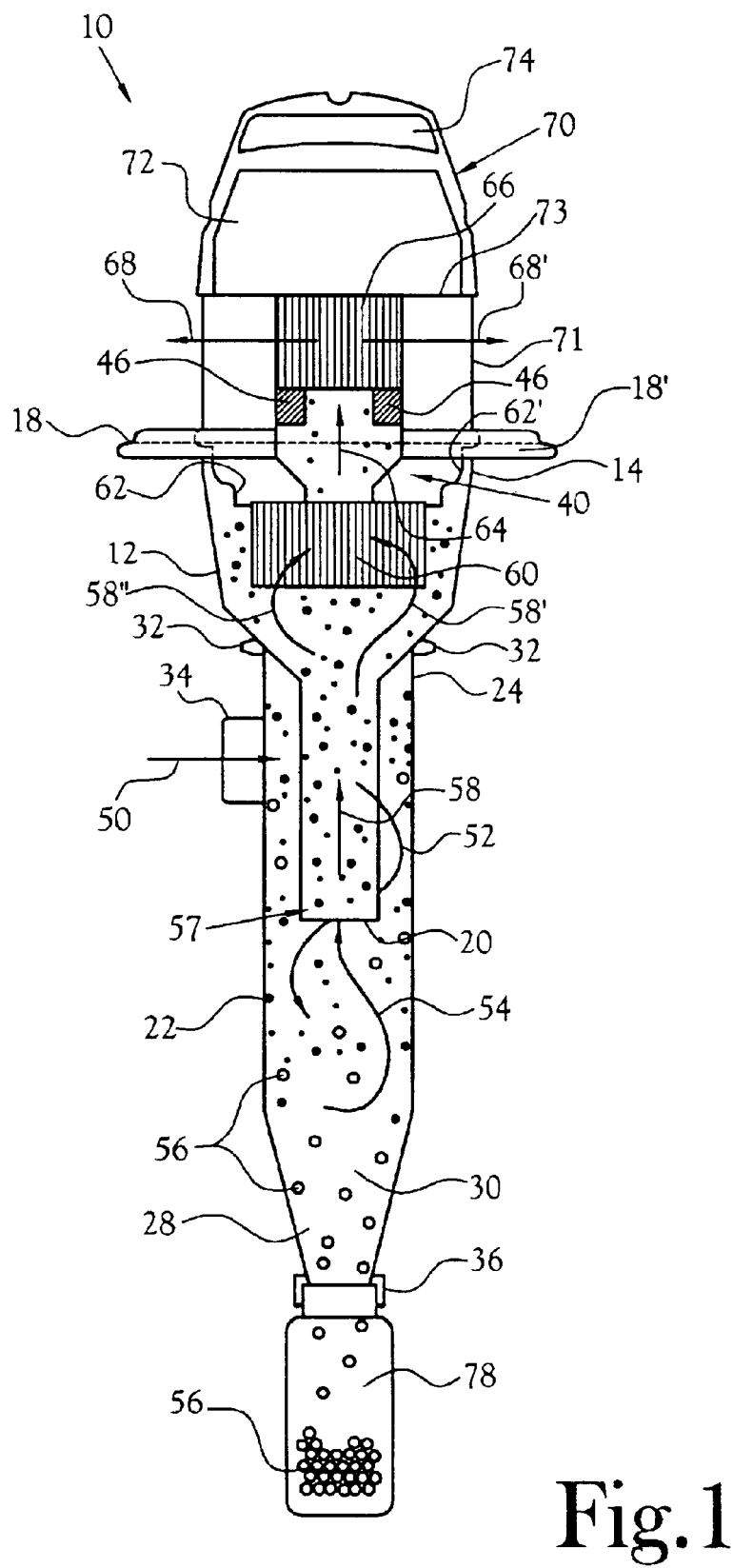
FIG. 1 is a front view of a criticality safe vacuum system of the present invention, illustrating the flow of a gas and separation of particles by multiple stages of separation.
Figure 7:
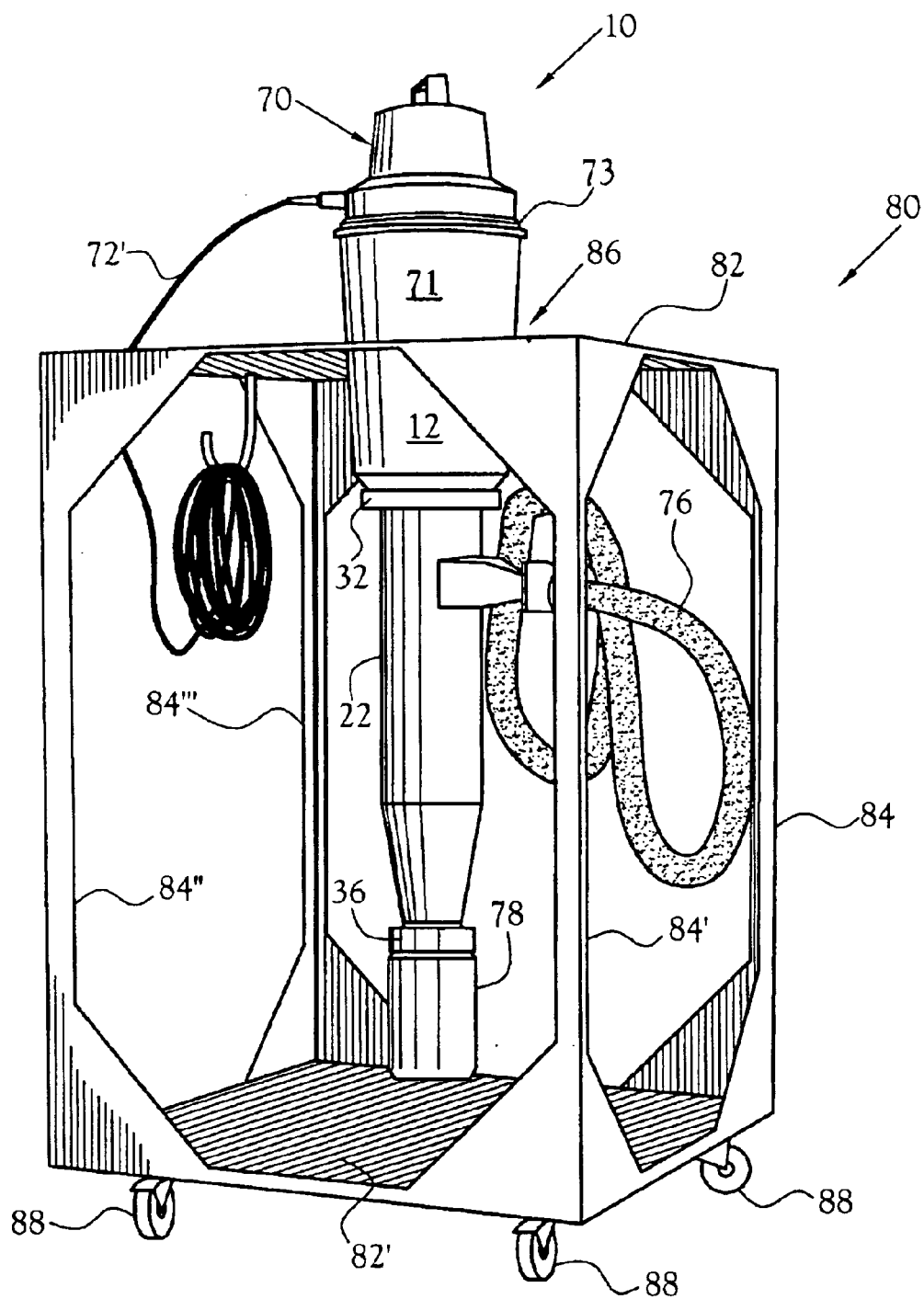
FIG. 7 is a side perspective view illustrating a safe geometry transport vehicle having the criticality safe vacuum system of the present invention supported therein.

The gas collection end 20 of the first filter housing 12 is telescopically inserted into connector end 24 to form a gas-tight connection between first filter housing 12 and cyclone housing 22, with the mated surfaces being the outer surface of funnel shaped mid-portion 16 and the inner circumference of connector end 24. The connector flange 32 is disposed to maintain the mated surfaces together during operation of the vacuum generating device and motor 72. An annular void space between the concentrically aligned interior walls of cyclone housing 22 and the exterior side surfaces of the gas collection end 20 is maintained by the telescopic insertion of gas collection end 20 having a lesser radius into connector end 24. The generally annular void space between the interior walls of cyclone housing 22 and the walls of gas collection end 20 allows for a plurality of cyclonic flow paths 52 of the gas and particles 50 around gas collection end 20. Within the inner circumference of connector end 24, at least one sealing gasket is positioned to be disposed between the outer surface of funnel shaped mid-portion 16 and the inner circumference of connector end 24. Proximal to an upper portion of the cyclone housing 22, an intake port 34 is extended through a side wall of the cyclone housing 22. The intake port 34 is sized to be detachably connected by a flanged connection to a detachable, flexible or rigid conduit 76 (see FIG. 7) for transmission into the cyclone housing 22 of the intake gas and particles 50, and/or a gas and liquid mixture, having a variety of large particles 56 and small particles 57 mixed within mixture of gas and particles 50. A pressure difference within cyclone housing 22 is maintained by a vacuum generating device and motor 72 to maintain a gas flow for cyclonic separation within the annular space between the mid-portion 26 of the cyclone housing 22 and the length of gas collection end 20 of first filter housing 12 that is telescopically inserted a selected distance into cyclone housing 22. As illustrated in FIG. 1, the cyclonic separation occurs in the cyclone housing 22 with the intake gas and particles 50 separating into a plurality of cyclone paths 52 within the mid-portion 26 of cyclone housing 22, including flow around the gas collection end 20 of the first filter housing 12 inserted a sufficient distance into connector end 24 of cyclone housing 22. The cyclone paths 52 of the gas and particles 50 force the larger particles 56 to impact against the interior walls of the mid-portion 26 with resulting movement downwards into a funnel 30 to the particle collection end 28 for collection of the larger particles 56 in a collection container 78. The collection container 78 is releasably connected to particle collection end 28 by a connector means 36 such as a threaded connector or a quick-release clamp connector known to those skilled in the art. The collection container 78 may include translucent side walls to allow an operator to monitor the fill level of the collected particles 56. An alternative connector means 36 may include a valve connector joint into which the opening of the collection container 78 is inserted. The connector means 36, whether a valve connector joint, a threaded connector, a quick-release clamp connector or an alternative connector (not shown), may alternately include a pair of closure flaps 38, 38' (see FIG. 2) composed of rigid or flexible materials that are attached to pivot against the connector means 36 at the particle collection end 28 for temporary closure of the collection end 28 when a collection container 78 is not attached thereto. The pair of closure flaps 38, 38', or a cover cap (not shown), is utilized in order to minimize the leakage of radioactive particles capable of criticality reactions and that are typically hazardous to human health if inhaled and/or ingested.

Figure 5A:
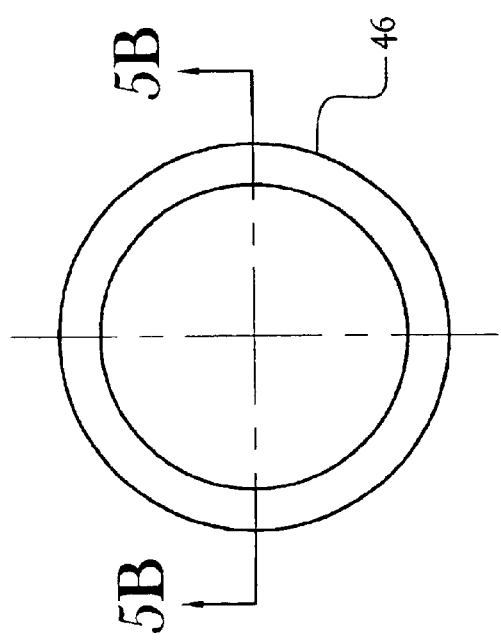
FIG. 5A is a top view of a reducer ring member.
Figure 5B:
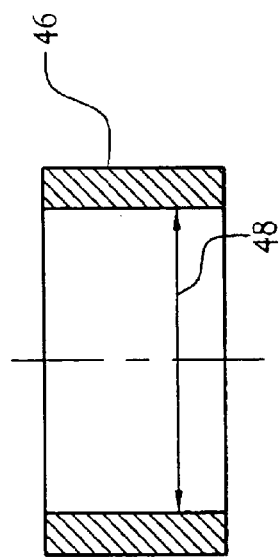
FIG. 5B is section view along 5B—5B of FIG. 5A, illustrating a section view of the reducer ring member.

Within an upper portion of the first filter housing 12 includes a third staged segment 40 including additional air filtration attached above an internal channel 40' that provides a channel for gases from the first filter to the second, exhaust filter, and provides an internal structural support for a commercially available vacuum generating device and motor 72. The internal channel 40' also provides a channel 48 through which gas and small particles pass after passage through the first stage of separation provided by cyclonic separation within the cyclone housing 22, and after passage through the second stage of separation within the first filtration media 60, typically provided by the use of high efficiency particulate (HEPA) filters. Gas and small particles of less than about two micrometers in diameter flow 64 through the width of channel 48 due to vacuum pressure provided by a vacuum head 42' maintained between first filtration media 60, second filtration media 66, and vacuum generating device and motor 72 along internal channel 40' (see FIG. 6) established within a vacuum chamber of a vacuum motor housing 70 as maintained by a vacuum means such as a vacuum device and motor 72 positioned within the vacuum motor housing 70. The vacuum device and motor 72 is provided with electrical power by an extension power cord 72' (see FIG. 7). The width of the path of flow 64 through channel 48 increases as the gas and particles move upwards through the internal channel 40', with a decrease in the rate of flow of gas into a second filtration media 66, which provides a third stage of separation of particles from the gas flow. The first filtration media 60 includes a cylindrical filter of high efficiency particulate (HEPA) filters having an efficiency for removal of particles from gasses of about 99.97% for particles down to about 0.3 micrometers in diameter. The first filtration media 60 is removably connected to a lower portion of channel 48 by an exhaust connector 42 that directs gas flow 64 from a center portion of the HEPA filter and into the channel 48 for transfer into an outlet 44 into the second stage of filtration media 66. The diameter of the outlet 44 is adjustable between a wide diameter that is greater than the diameter of the exhaust connector 42, to a lesser diameter to increase gas flow by a cylindrical reducer ring 46 (see FIGS. 5A, 5B and 6), that is removably insertable into the outlet 44. The reducer ring 46 is replaceable with a like-configured reducer ring having an alternately sized internal diameter having a larger or smaller internal diameter (not shown) in order to modify the speed of the flow of gas from the first filtration media 60 through the second stage of filtration media 66. The second stage of filtration media 66 includes a cylindrical filter such as a ULPA filter, or alternately a second HEPA filter, that is attached at an upper end of the channel 48 through outlet 44. The ULPA filter includes filtration media material having an efficiency of particle removal from gasses of at least about 99.999% for particles down to about 0.12 micrometer in diameter. The flow of gas is directed into a central portion of the second stage filtration media 66 with filtered gas exiting from filtration media 66 for escape from the vacuum motor housing 70 by a plurality of vents (not shown).

The flow of gas and particles through the vacuum system 10 includes an intake flow of gas and particles 50 into intake port 34, a plurality of cyclone paths 52 around gas collection end 20, with movement downwards within cyclone housing 22 for particles 56 greater than about two micrometers in a downwardly flow. Alternate lengths of cyclone housing 22 can be attached to first filter housing 12, to provide longer or shorter cyclone paths 52 for alternative rates of separation of larger particles 56 from gas having larger and smaller particles 57 entrained therein. Gas flow 54 with particles 57 smaller than about two micrometers will enter, concurrently with the separation of larger particles 56, into gas collection end 20 for vacuum induced movement upwards 58 for flow 58', 58" into the side portions of first filtration media 60. The smaller particles 57, down to about two micrometers, are entrapped within first filtration media 60, with gas flow 64 out of a center portion of the first filtration media 60. The gas exhaust flow 64 is upwards through exhaust connector 42 and through outlet 44, for flow into a center portion of the second filtration media 66. With entrapment of particles of about 0.12 micrometers in diameter, or larger, within the second filtration media 66, the exhaust gas flow 68' is laterally outwards from the second filtration media 66 for escape from a plurality of vents from vacuum motor housing 70. The vacuum motor housing 70 may include rechargeable batteries to provide power to the vacuum device and motor 72 for operation in areas without electrical power outlets. A handle 74 is formed into the upper portion of the vacuum motor housing 70 that is releasably detachable from the upper housing segment 71 along upper housing seam 73 to provide a removal means for separating vacuum motor housing 70 to allow removal and replacement of vacuum motor and second filtration media 66 removably positioned in the upper portion of vacuum motor housing 70. Separation of first filtration media 60 from internal channel 40' is provided when flange 18, 18', 18" is detached from the vacuum motor housing 70 at the outer surfaces 62", 62'" of base wall portions 62' for changing of the first filtration media 60 and second filtration media 66.

A transport cart 80 is provided as a support vehicle for support of the criticality safe vacuum system 10 in a safe geometry configuration in relation to a like-configured criticality safe vacuum apparatus having a cyclone housing 22 therein. The transport cart 80 includes an upper platform 82 and a lower platform 82', disposed in parallel, substantially horizontal, and spaced-apart configuration from each other (see FIG. 7). Each platform 82, 82' may be circular, square or a similar configuration while providing a central opening 86 into which the first filter housing 12 and cyclone housing 22 are insertable for support within the transport cart 80 of the assembled vacuum system 10. The platforms 82, 82' include a sufficiently sized side dimension, or a sufficiently sized radius between the central opening 86 and a perimeter of each platform 82, 82', to provide a criticality safe distance extended in each horizontal direction from the centrally positioned vacuum system 10. The criticality safe minimum side distance, or minimum radius, is calculated by a person skilled in the art for each radioactive particulate that is collected within the vacuum system 10. One example of a side dimension for a square configuration is about thirty inches of width for each side of the platforms 82, 82', if Uranium 235 is collected within the criticality safe vacuum system 10. The platforms 82, 82' are supported in spaced-apart configuration by a plurality of side support members 84, 84', 84", 84'". The second, lower platform 82' is spaced-apart from the first, upper platform 82, a sufficient distance to allow the collection container 78 to be removed from connector 36, and to allow alternative lengths of the cyclone housing 22 to be attached to the first filter housing 12 for support within the central opening 86. The transport cart 80 is supported above a support surface such as a floor of a radioactive contaminated area by a plurality of pivotable brackets having at least one wheel 88 connected to each bracket. The pivotable brackets and wheels are known to those skilled in the art for mobile carts that are transportable along generally planar floors to other locations.

From the foregoing description, it will be recognized by those skilled in the art that an elongated shape having interior size-limited widths are necessary for each of the first, containment housing 12 and the cyclone housing 22, the internal channel 40, and for the collection container 78 in order to maintain the internal geometries of the respective housings and container below a calculated volume related to the type of radioactive and fissionable particles that are contained within the vacuum system 10. Each internal geometry and gas flow path within the vacuum system 10 is sized to not allow a significant build-up of fissionable particles in respective openings, paths, and collection containers within or attached to the housings 12, 22, 40. Further, the internal surfaces of the housings are maintained as polished, preferably smooth surfaces having a minimum of corners to reduce retainment of radioactive, fissionable particles within the vacuum system 10. An overall goal of the criticality safe vacuum system 10 is to efficiently and safely separate radioactive, fissionable particles from gas streams, and/or gas and liquid mixtures, by stages of separation including cyclonic separation, a first stage of high efficiency filtration and a second stage of high efficiency filtration, with the particles collected for safe containment within collection containers and disposable filtration media. An alternative embodiment includes the vacuum system 10 sized to not allow a significant build-up of fissionable particles in respective openings, paths, and collection containers within or attached to the housings 12, 22, 40, and an external layer added of shielding material such as lead or another material utilized for shielding operators from radioactive particle emissions from radioactive materials. The external layer of shielding (not shown) may be removably attached to the transport cart 80, or may be removable attached to encircle one or all of the housings 12, 22, 40. A further alternative embodiment includes providing an internal surface layer (not shown) within one or all of the housings 12, 22, 40, with the internal surface layer composed of shielding material known to those skilled in the art for shielding operators from radioactive particle emissions from radioactive materials.

While the present invention has been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

What is claimed is:

1. An apparatus for the staged removal of particulates including radioactive particles entrained in gas, comprising:
    a first staged segment having a void space therein, said first staged segment having a connector end and an intake port disposed proximal to said connector end, said first-staged segment having a collection end opposed from said connector end;
    a second staged segment including an insertion end and an opposed gas exhaust end concentrically aligned, said gas exhaust end having a filter housing disposed therein, said filter housing including a first end and an opposed second end, said first end having a first filtration media removably attached to be positioned concentric with said gas exhaust end, said second staged segment having said insertion end extended a selected distance within said connector end of said first-staged segment, said selected distance extends said insertion end within said void space in said first-staged segment to a position below said intake port of said first-staged segment; and
    a pressure differential maintained between said first-staged segment and said second staged segment, said pressure differential is maintained to induce the flow of gas from said first staged segment and into said second-staged segment through said insertion end, whereby the flow of gas is generally from said intake port and into said void space with induction of cyclonic flow through said void space and around said insertion end as the flow of gas approaches said insertion end of said second staged segment, said pressure differential induces gas flow into said insertion end concurrently with the particulates moved toward said collection end of said first staged segment as the flow of gas exits said void space into said insertion end of said second staged segment for flow of gas toward said gas exhaust end of said second staged segment.

2. The apparatus of claim 1, wherein said first staged segment including:
    a cyclone housing having a connector flange disposed at said connector end, said connector end having a sufficient diameter for insertion therein of said insertion end of said second-staged segment, said cyclone housing of said first staged segment is detachable at said connector flange from said second-staged segment with replacement of a like-configured second cyclone housing having said sufficient diameter of a like-configured flanged connector end for acceptance therein of said insertion end of said second-staged segment, said like-configured second cyclone housing having a second length for alternate cyclonic flow therein; and
    a collection container releasably connectable to said collection end, said collection container is substantially translucent and is sized in a geometry for storage of particulates including radioactive particles without nuclear criticality reactions within said collection container, whereby the amount of radioactive particles within said collection container is visually observable by a person positioned an adequate distance from said collection container for minimal exposure to radioactivity from said radioactive particles.

3. The apparatus of claim 2 wherein said second staged segment including:
    said insertion end having a gas collection end sized to insert concentrically within said connector end of said first staged segment, said gas collection end is disposed a sufficient distance within said connector end to be positioned below said intake port;
    said gas exhaust end of said second staged segment including an outer perimeter flanged connector sized to be releasably connectable to a vacuum motor housing having a forced air generator therein, said forced air generator sized to maintain said pressure differential between said first staged segment and said second staged segment;
    said filter housing inserted within said gas exhaust end, said first filtration media is removably attached to be suspended within said gas exhaust end of said second-staged segment, said first filtration media having an internal diameter opening surrounded by an external perimeter of filtration media whereby the flow of gas is through said external perimeter of filtration media and through said internal diameter opening for exhaust from said gas exhaust end, said first filtration media being removably replaceable by detachment of said outer perimeter flanged connector from said vacuum motor housing without disconnection of said second staged segment from said first staged segment; and
    a reducer ring supported centrally within said filter housing, said reducer ring having an internal diameter for passage of the flow of gas therethrough, said reducer ring is replaceable with a like-configured reducer ring having an alternately sized internal diameter.

4. The apparatus of claim 3 including a third staged segment having a base end releasably connected to said outer perimeter flanged connector of said gas exhaust end of said second staged segment, said third staged segment having a second filtration media removably positioned to align concentrically with said reducer ring, said second filtration media having a base internal opening surrounded by an external perimeter of filtration media whereby the flow of gas is through said base internal opening and outwards through said external perimeter of said second filtration media for the flow of gas for exit from said third-staged segment, said second filtration media being replaceable separately from said first filtration media.

5. The apparatus of claim 4 wherein said pressure differential is maintained by a forced air generator including a vacuum device attached to said third staged segment for maintenance of a flow of gas through said first staged segment, said second staged segment and said third staged segment;

whereby the particulates are removed from the flow of gas by the cyclonic movement of the flow of gas and particulates within said first staged segment, with residual particulates removed from the gas during gas flow through said first filtration media of said second-staged segment and said second filtration media of said third-staged segment while the flow of gas through each of said staged segments is continuously maintained by said vacuum device.

6. The apparatus of claim 5 wherein said vacuum device including a vacuum motor having a control means for adjustment of the speed of the flow of gas through said first, second and third staged segments, said vacuum motor is operated to maintain the flow of gas through said first-staged segment and said second staged segment filter housing, whereby said telescopic configuration of said second staged segment insertion end within said first staged segment connector end provides continuous cyclonic movement of gas and particulates within said first staged segment during operation of said vacuum pump.

7. The apparatus of claim 6 wherein said second staged gas collection end having a diameter less than the diameter of said gas exhaust end, said gas exhaust end having said vacuum pump attached thereto for movement of gas and residual particulates through said gas collection end for flow through said first filtration media, said gas collection end having a sufficient length to extend to about a mid-portion of said first staged segment, said gas collection end having a size-limited geometry for passage of gas and particulates including radioactive particles capable of nuclear criticality reactions without occurrence of a criticality reaction.

8. The apparatus of claim 7 wherein said first staged segment being elongated and being removably connected by said connector flange to said insertion end of said second-staged segment, said first staged segment collection end having a size-limited geometry for movement therethrough of particles capable of nuclear criticality reactions without occurrence of a criticality reaction.

9. An apparatus for removal of particulates including radioactive particles entrained in gas comprising:

a filter housing including a gas collection end and a gas exhaust end, said gas collection end having a diameter less than the diameter of said gas exhaust end;

an interior housing disposed within said gas exhaust end of said filter housing, said interior housing including a first end having a filtration media disposed for flow of gas therethrough;

a cyclone housing having a connection end, an intake port disposed through a perimeter wall proximal to said connection end, and having a particle collection end opposed from said connection end, said connection end having a sufficient first diameter for insertion therein of said gas collection end of said filter housing, said cyclone housing having an elongated length extended to said particle collection end, said particle collection end having a second diameter of a lesser diameter than said first diameter of said connection end, said second diameter of said particle collection end having a size-limited geometry for passage through of radioactive particles without occurrence of a criticality reaction, and a vacuum means releasably attached to said gas exhaust end of said filter housing, said vacuum means operates to induce a cyclonic movement of the gas and particulates within said cyclone housing;

whereby the particulates are removed from the gas by the cyclonic movement of the gas and particulates within said cyclone housing, with the particles collected at said cyclone housing particle collection end and the gas simultaneously flows through said filtration media for flow from said gas exhaust end of said filter housing.

10. The apparatus of claim 9 wherein said filter housing gas collection end having a sufficient length to extend a sufficient distance through said cyclone housing to about a mid-portion of said cyclone housing, said filter housing gas collection end having a size-limited geometry for passage of gas and radioactive particles capable of nuclear criticality reactions without occurrence of a criticality reaction.

11. The apparatus of claim 10 wherein said filtration media further including a first filtration media and a second filtration media attached at opposed ends of said filter housing, said first and second filtration media are positioned for flow of the gas and particulates through said first filtration media and through said second filtration media.

12. The apparatus of claim 11 wherein said vacuum means including a vacuum motor operated to maintain a pressure differential within said cyclone housing between said particle collection end and said collection end of said cyclone housing having said gas collection end of said filter housing attached therein, said pressure differential provides a cyclonic movement of gas around said gas collection end of said filter housing disposed within said cyclone housing.

13. The apparatus of claim 12 wherein said first and said second filtration media further includes a first and a second high efficiency filtration media that are each removably disposed at opposed ends of said interior housing, said first and second high efficiency filtration media including an internal opening surrounded by an external perimeter of high efficiency filtration media whereby the flow of gas proceeds from said gas collection end of said filter housing and through said external perimeter of said first high efficiency filtration media for retention of particulates within the first high efficiency filtration media and flow of gas through said gas exhaust end of said filter housing.

14. The apparatus of claim 13 wherein said interior housing including said second high efficiency filtration media removably disposed at a second end of said interior housing, said second filtration media having a base internal opening surrounded by an external perimeter of filtration media whereby the flow of gas proceeds through said base internal opening with retention of particulates within the second high efficiency filtration media, whereby the gas flows outwards through said external perimeter of filtration media for lateral flow of gas for exit from said filter housing through said gas exhaust end; and a reducer ring having an external diameter for placement within said interior housing, said reducer ring is replaceable with a like-configured second reducer ring having substantially similar external diameter and an alternative internal diameter than said reducer ring;

whereby the flow of gas through said interior housing is changed by replacement of said reducer ring with said like-configured reducer ring.

15. The apparatus of claim 14 wherein said cyclone housing including a collection container releasably connectable to said particle collection end, said collection container is sized in a sufficient size-limited internal geometry for storage without occurrence of criticality reactions of collected radioactive particles, said collection container is substantially translucent to allow an operator to visually observe the volume of collected particulates within said collection container for verification that a preselected limit is not exceeded for the volume of the radioactive particles therein.

16. The apparatus of claim 15 wherein said apparatus further comprising a support vehicle having a sufficient external diameter to maintain said cyclone housing at an adequate distance from a like-configured cyclone housing positioned proximal to said support vehicle, said like-configured cyclone housing supported within a like-configured support vehicle, each support vehicle including a frame having side members connected to an upper member and a lower member, said lower member having wheels for movement of said support vehicle to storage proximal to like-configured cyclone housings without an occurrence of criticality reactions between radioactive particles within each respective cyclone housing.

17. An apparatus for removal of particulates including radioactive particles from a gas having an aerosol mixture of particulates and liquids, comprising:

a filtration separation segment including a filter housing disposed therein, said filter housing having an insertion end and a gas exhaust end concentrically opposed from said insertion end, a cyclonic flow segment including a cyclone housing having a selected length extending between a connector end and an opposed particle collection end, and having an enclosed void space therebetween, said filter housing insertion end is inserted into said connector end a sufficient length to extend to about a mid-portion within said void space, said cyclone housing having an intake port disposed proximal to said connector end, said cyclone housing having a size-limited geometry for containment of gas and particulates therein without criticality reactions between radioactive particles therein;

said insertion end of said filter housing having an end opening positioned below said intake port, said end opening receives gas therein for gas flow through said insertion end toward said gas exhaust end;

a pressure differential maintained between said particle collection end of said cyclone housing and said gas exhaust end of said filter housing within said filtration separation segment, said pressure differential provides a cyclonic movement of gas within said selected length of said cyclone housing having said insertion end therein; and a first filter removably disposed in concentric alignment between said insertion end and said gas exhaust end of said filter housing, said first filter having an internal opening surrounded by an external perimeter of filtration media, whereby the flow of gas is from said insertion end and into said external perimeter of filtration media for gas flow into said first filter internal opening and toward gas exhaust end of said filter housing;

whereby the particulates including radioactive particles are separated from the gas during cyclonic flow within said cyclone housing, the radioactive particles are collected at said particle collection end simultaneously with gas flow through said insertion end and through said first filter within said filter housing for entrapment of residual particles within said first filter before gas exits from said first filter.

18. The apparatus of claim 17 further comprising:

a support bracket attached to an upper portion of said cyclone housing, said support bracket connects said filter housing insertion end to said connection end of said cyclone housing to allow said filter housing insertion end to telescopically extend into said connector end of said cyclone housing;

a second filter removably disposed within said filter housing and releasably positioned to align concentrically above said internal opening of said first filter, said second filter having a base internal opening surrounded by an external perimeter of filtration media whereby the gas flows through said base internal opening and outwards through said external perimeter of said second filter for gas flow for exit from said filter housing through said gas exhaust end;

a reducer ring having an external diameter sized for placement within said support bracket, said reducer ring is replaceable with a like-configured replacement reducer ring having substantially similar external diameter and an internal diameter of an alternate diameter than said reducer ring;

means for connection disposed at said particle collection end, said means for connection provides a gas-tight connection with said filter housing; and a collection container releasably connectable to said means for connection, said collection container is substantially translucent for viewing therethrough by an operator, said collection container is size-limited by a geometry for storage without nuclear criticality reactions between the radioactive particles within said collection container.

19. The apparatus of claim 18 wherein said apparatus including a transport cart having a selected external diameter to maintain said cyclone housing an adequate distance from like-configured cyclone housings stored proximal to said cyclone housing, said transport cart including a frame having side members connected to an upper member and a lower member, said lower member having wheels attached for movement of said transport cart to maintain said adequate distance from like-configured cyclone housings without a criticality reaction between radioactive particles within each respective cyclone housing.

20. An apparatus for removal of particulates including radioactive particles entrained in gas comprising:

a filter housing including a gas collection end and a gas exhaust end, said gas collection end having a diameter less than the diameter of said gas exhaust end;

an interior housing disposed within said gas exhaust end of said filter housing, said interior housing including a first end disposed proximal to said gas collection end of said filter housing and having an opposed second end, said first end having a first filtration media removably attached thereto for flow through of gas from said gas collection end, said second end having a second filtration media removably attached thereto for flow through of gas after the gas passes through said first filtration media;

a cyclone housing having a connection end, having an intake port disposed through a perimeter wall proximal to said connection end, and having a particle collection end opposed from said connection end, said connection end having a sufficient first diameter for insertion therein of said gas collection end of said filter housing, said cyclone housing having an elongated length extended to said particle collection end, said particle collection end having a second diameter of a lesser diameter than said first diameter of said connection end, said second diameter of said particle collection end having a size-limited geometry for passage of radioactive particles without occurrence of a criticality reaction;

a forced air generator including a vacuum device releasably attached to said gas exhaust end of said filter housing, said vacuum device operates to induce a cyclonic flow of gas and particulates around said gas collection end inserted within said connection end of said cyclone housing; and a collection container releasably connectable to said particle collection end, said collection container having a sufficient size-limited internal geometry for storage without occurrence of a criticality reaction within the collected radioactive particles, said collection container is substantially translucent to allow an operator to visually observe the volume of collected particulates within said collection container for verification that a preselected limit is not exceeded for the volume therein of the radioactive particles;

whereby the particulates are removed from the gas by the cyclonic flow of the gas and particulates around said gas collection end inserted within said cyclone housing, with the particulates collected at said cyclone housing particle collection end and the flow of gas concurrently through said first and second filtration media for flow of gas without particles therein from said gas exhaust end of said filter housing.

* * * * *